United States Patent [19]
Kracht et al.

[11] Patent Number: 5,374,105
[45] Date of Patent: * Dec. 20, 1994

[54] VEHICLE SEAT ASSEMBLY WITH IMPROVED FRONT PANEL

[75] Inventors: Thomas F. Kracht, Canton; Daniel N. Higgins, Ann Arbor, both of Mich.

[73] Assignee: Hoover Universal, Inc., Plymouth, Mich.

[*] Notice: The portion of the term of this patent subsequent to Mar. 15, 2011 has been disclaimed.

[21] Appl. No.: 978,744

[22] Filed: Nov. 19, 1992

[51] Int. Cl.⁵ .............................................. B60N 2/42
[52] U.S. Cl. .............................. 297/216.1; 280/753; 297/481; 297/423.31
[58] Field of Search ........... 297/216.1, 423.1, 423.26, 297/423.3, 487, 464, 481, 423.31; 296/65.1, 68.1; 280/753, 735; 180/282

[56] References Cited

U.S. PATENT DOCUMENTS

| | | | |
|---|---|---|---|
| 4,023,643 | 5/1977 | Bagley | 280/753 |
| 4,154,472 | 5/1979 | Bryll | 296/68.1 |
| 4,225,178 | 9/1980 | Takada | 297/216.1 |
| 4,951,963 | 8/1990 | Behr | 280/753 |
| 5,131,681 | 7/1992 | Wetzel | 280/753 |
| 5,149,165 | 9/1992 | Woolley | 296/68.1 |
| 5,294,175 | 3/1994 | Elton | 297/216.1 |

*Primary Examiner*—P. Austin Bradley
*Assistant Examiner*—James Miner
*Attorney, Agent, or Firm*—Harness, Dickey & Pierce

[57] ABSTRACT

A vehicle seat assembly having a front panel that is deployable to a forwardly extending position to support a vehicle occupant who has moved forward off the seat cushion during a frontal impact collision. Improvements to the panel deployment mechanism are shown including an electronically activated latch release to deploy the panel upon a predetermined deceleration measured by an accelerometer mounted to the seat assembly or elsewhere on a motor vehicle.

19 Claims, 2 Drawing Sheets

VEHICLE SEAT ASSEMBLY WITH IMPROVED FRONT PANEL

BACKGROUND AND SUMMARY OF THE INVENTION

The present invention relates to a vehicle seat assembly with a front panel to automatically extends the effective length of the vehicle seat cushion in the event of an accident and in particular to improvements in the design and operation of the front panel. This application is related to copending application, Ser. No. 07/978,746, filed the same day, and now U.S. Pat. No. 5,294,175 and entitled Vehicle Seat Assembly With a Front Panel. That application is commonly assigned with the present application and is hereby incorporated by reference.

Current automobile design standards require that the vehicle contain features to protect occupants who do not actively fasten their seat belts. The most well known features to protect an occupant are air bags and automatic belt systems. The air bags or automatic belts are used to restrain the upper torso of a vehicle occupant. The lower torso of an occupant is restrained by knee bolsters formed in the vehicle instrument panel. However, for the bolsters to be effective, the knees of the occupant must be fairly close to the bolsters before the vehicle collision.

Since the driver's seat must be adjusted to a position that enables the driver to reach the vehicle control pedals, the driver's knees will be positioned fairly close to the instrument panel knee bolsters. In addition, the steering wheel acts to keep the driver from moving off the seat assembly. However, for occupants seated in the passenger seat of the vehicle, it is not uncommon for the seat assembly to be adjusted too far rearwardly for the knee bolsters to be effective in preventing the occupant from moving forward, off the seat cushion during a frontal impact collision. This is particularly true for relatively small persons.

Without restraint to prevent a seat occupant from moving forward, the occupant can move forward, off the seat cushion. With the legs bent at the knees, the occupant's torso will then fall to the floor forward of the seat cushion between the instrument panel, the air bag (if the vehicle is so equipped) and the front edge of the seat cushion. This can cause severe back injuries as well as facial and head injuries. Occupant's who remain on the seat cushion will "bounce" back into the seat after impact with the vehicle instrument panel or air bag. This reduces the severity of injuries as compared to occupant's that fall to the vehicle floor forward of the seat cushion.

The referenced patent application discloses and claims a vehicle seat assembly having panel rotatably mounted at the front of the seat cushion. The panel has a stowed position forming the front of the seat cushion. During a frontal impact collision resulting in a deceleration of the vehicle greater than a predetermined level, the panel is automatically rotated to a support position extending forward from the seat cushion. The panel is automatically locked in place to support a seat occupant who has moved forward, onto the panel. Before the occupant can slide forward off the panel, the occupant's knees will strike the knee bolster and the occupant will "bounce" back onto the seat cushion. The panel prevents the occupant from falling forward of the cushion. A bias spring urges the support panel to the deployed position while an inertia release latch holds the support panel in its stowed position until the seat experiences the predetermined deceleration necessary to deploy the panel.

The present application improves upon the device of the referenced application by replacing the inertia release latch with an electronically activated latch release that is coupled to the air bag deployment system for simultaneous deployment of the seat panel and air bag. In addition, with such an electrically activated release latch, it is possible to disable the panel when a seat occupant has fastened their seat belt. When an occupant has done so, the seat belt system will restrain the occupant in the seat assembly thus obviating the need for the panel. Additional improvements to the operating mechanism for the seat panel are also disclosed.

Further objects, features and advantages of the invention will become apparent from a consideration of the following description and the appended claims when taken in connection with the accompanying drawings.

DETAILED DESCRIPTION OF THE INVENTION

Figure 1:
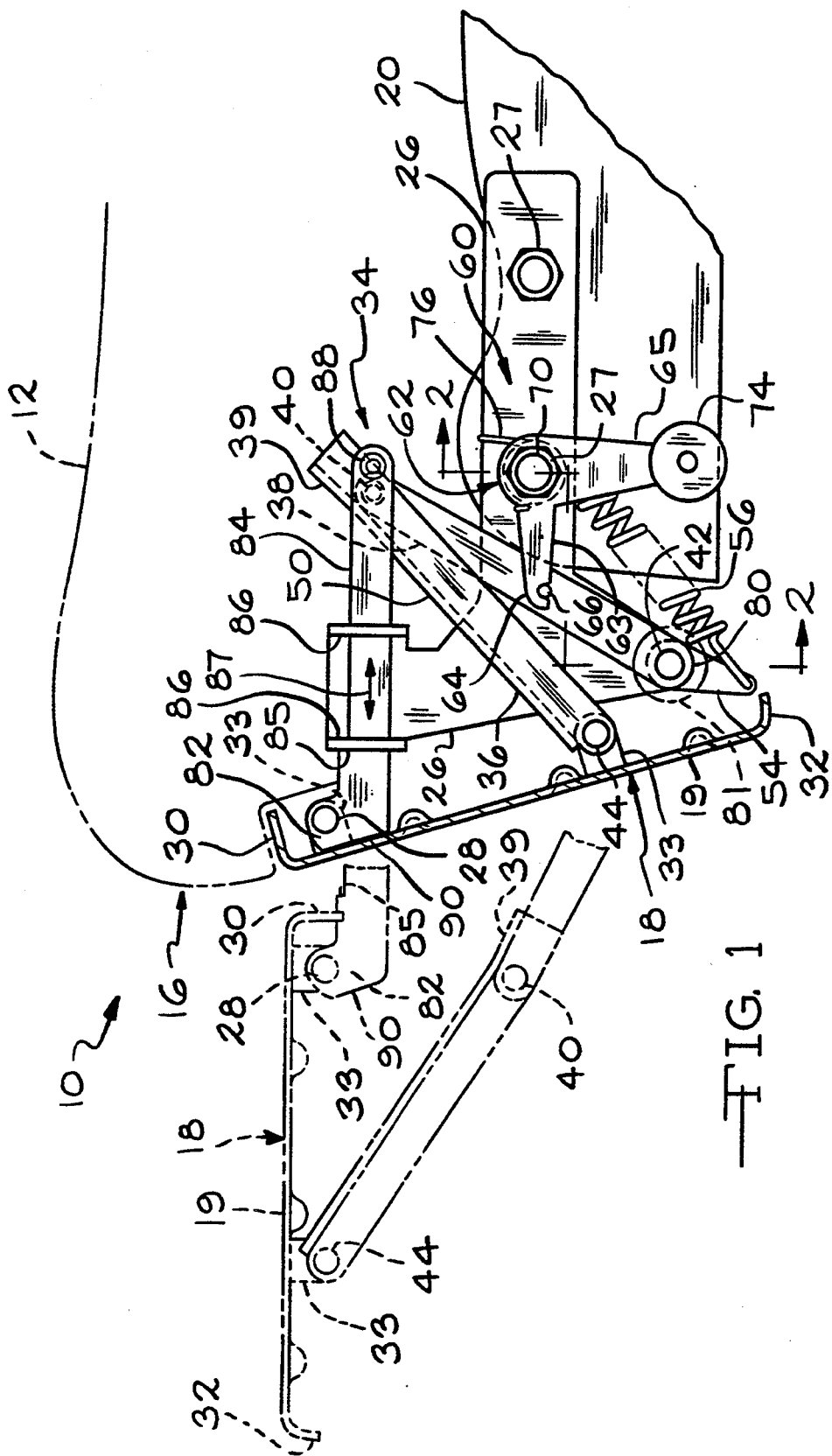
FIG. 1 is a fragmentary side elevational view of the seat assembly illustrating the panel and structure for mounting the panel to the seat cushion.

The seat assembly of the present invention, containing a deployable front panel, is disclosed in FIG. 1 and designated generally at 10. Seat assembly 10 includes a lower seat cushion 12 which is generally horizontal and a seat back (not shown) extending upwardly at the rear of the seat cushion in a conventional manner for vehicle seats. The front end 16 of the seat cushion includes a panel 18 which is shown in an upright stowed position in solid line forming the front face of the seat cushion. The panel 18 is shown in phantom line rotated to a deployed or support position in which it extends forwardly from the front end of the seat cushion. To reach the deployed position, the panel is rotated about a transverse axis at the front of the seat cushion. In the deployed support position, the panel 18 will support the weight of a seat occupant who has moved forward, off of the seat cushion 12, in response to the deceleration of the vehicle and seat assembly during a vehicle front impact collision. The panel helps to prevent an unrestrained occupant from falling to the vehicle floor, forward of the seat cushion, and receiving additional injuries.

Figure 2:
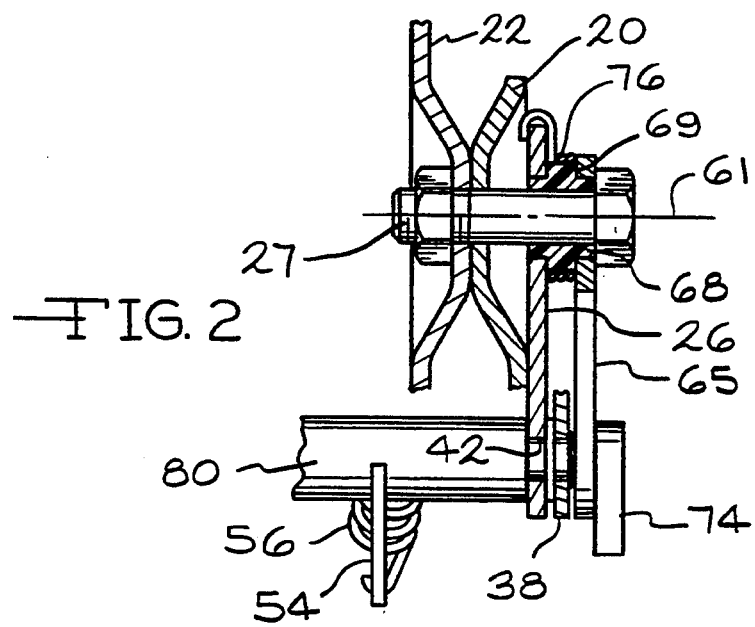
FIG. 2 is a front elevational view of the panel mounting structure and deployment mechanism along one side of the seat assembly shown in FIG. 1.

Seat assembly 10 has a frame including a pair of laterally spaced risers 20. In the case of a fore and aft adjustable seat assembly, the risers are mounted to slide rails (not shown) that are movable fore and aft to adjust the seat position relative to the vehicle. A seat pan 22 (FIG. 2) and a seat back frame are mounted to the risers in a conventional manner. The operating mechanism for deployment of panel 18 includes frame members in the form of a base plates 26 mounted to the risers 20 with bolts 27 or the like. The bolts 27 can also be used to attach the seat pan 22 to the risers 20.

The panel mounting structure and deployment mechanism is described with reference to only one side of the seat assembly. The two sides are identical except where noted. The panel 18 is stowed in a generally upright position at the front of the seat cushion and forms the front surface of the cushion. The panel 18 is coupled to the base plate 26 at a pivot joint 28 near the upper end 30 of the support panel 18. From the pivot joint 28, the panel extends downward to its lower end 32. The panel 18 is made of molded plastic or stamped metal having a generally flat top wall or surface 19. The panel is covered with upholstery (not shown) to match the seat assembly and vehicle interior. Mounting bosses 33 are molded or stamped into the panel 18.

A pair of links, upper link 36 and lower link 38 form a folding brace 34 for supporting the panel 18 in the extended support position. The upper and lower links are joined together at a pivot joint 40 to enable the brace to fold. The lower link 38 is coupled to a torque tube 80 (FIG. 2) that extends transversely of the seat cushion and is joined to the base plate 26 at each side of the cushion at a pivot joint 42. The upper link 36 is joined to the bottom of the panel 18 at a pivot joint 44. Pivot joint 44 is spaced forwardly from the pivot joint 28 so that the brace 34 provides support to the panel in the extended position.

Upper link 36 has a U-shaped cross-section with an end wall 50. The lower link 38 is positioned within the U-shaped cross-section of upper link 36. When the panel 18 is in the stowed position, the brace 34 is folded at the pivot joint 40 with the two links 36 and 38 extending generally in the same direction from the pivot joint 40. As the panel is deployed and the brace 34 unfolded, the two links will rotate about joint 40 until the links extend in opposite directions from the joint 40 relative to one another as shown in phantom line. The links rotate slightly beyond a straight line position to a position slightly over-center. In this over-center position, a downward load applied to the panel will act on the brace to urge continued rotation of the links away from the folded position.

The upper link extends slightly beyond the joint 40 toward the joint 42 forming an end portion 39. The top wall 50 of the end portion is inclined relative to the top wall of the remainder of the link 36 allowing the links to rotate to the over-center position. The top wall 50 serves to stop rotation in the deployed position.

A lever 54 extends radially downwardly from the torque tube 80 extending across the seat assembly connecting the braces at both sides of the seat. A deployment spring 56 is connected to the lever 54 and to the seat frame to apply a torque to the tube 80. The spring 56 provides the torque necessary to rotate the tube 80 in a counterclockwise direction about pivot joint 42, as viewed in FIG. 1, to unfold the brace 34 and deploy the panel. As the lower link is rotated, the pivot joint 40 moves forward, moving the upper link and panel forward. After the panel has been deployed, the spring 56 maintains a torque on the torque tube 80 to urge the brace 34 to the over-center deployed position. After deployment, the panel can be returned to its stowed position by applying a force to the brace at joint 40 in opposition to the spring 48 to fold the brace once again to its stowed position. Alternatively, a hand knob 81 can be provided at one end of the torque tube 80 for returning the panel to its stowed position by rotating the knob.

To increase the extension of the panel from the front end of the seat cushion without using a larger panel, the pivot joint 28 is slidably mounted to the seat cushion frame. The pivot joint 28 at the upper end of the panel 18 is connected to a mounting portion 82 of a slide rail 84. The slide rail 84 is mounted to lateral flanges 86 in the base plate 26 to move fore and aft as indicated by the arrow 87. In the stowed position, a stop 85 rests against the forwardmost lateral flange 86 to limit rearward movement of the slide rail 84. When the panel is deployed, the slide rail will be moved forward, moving the pivot joint 28 forward to extend the panel further forward from the seat cushion. A pin 88 extends from the slide rail at its rear end for engagement with the rearwardmost lateral flange 86 to limit the forward extension of the slide rail. In the event that the panel 18 can be made long enough to provide the desired extension from the seat cushion without the pivot joint 28 being moved forward, the upper end of the panel can be pivotally connected directly to the base plate 26 without the use of a slide rail.

The front edge 90 of the slide rail 84 is positioned adjacent to the inner surface of the panel 18. This positioning prevents the slide rail 84 from moving forward absent deployment of the panel. Without unfolding of the brace 34, the pivot joint 28 is held stationary. If the slide rail 84 were to move forward, the panel would interfere with the front edge of the slide rail.

A latch mechanism 60 is provided on only one side of the seat assembly for engagement with the link 38 to oppose the spring 56 and retain the panel 18 in its stowed position until the desired deceleration acts on the seat assembly. The latch mechanism 60 includes an "L" shaped latching lever 62 having a pair of legs 63 and 65 extending from a pivot 70 as formed by the forwardmost bolt 27. The latching lever 62 is rotationally mounted by the pivot 70 as shown in greater detail in FIG. 2. The latching lever generally lies in a vertical plane rotating about a horizontal transverse axis 61 defined by bolt 27. Latch leg 63 ends in a hook 64 engaging a latch pin 66 on the lower link 38 to resist rotation of the lower link to deploy the panel.

The release leg 65 of the latching lever 62 extends downward and has a weight 74 at its lower end. When the vehicle experiences a deceleration above a preset value, the inertia of the weight 74 will cause the entire latching lever 62 to rotate clockwise as viewed in FIG. 1. This rotation releases the hook 64 from the pin 66, enabling the spring 56 to rotate the lower link 38 and deploy the panel 18. To prevent inadvertent deployment caused by vehicle vibration etc., a torsion spring 76 is provided between the leg 63 and the base plate 26 to resist rotation of the release lever 72. The spring 76 and weight 74 must be carefully calibrated to provide release of the panel when desired.

The pivot 70 is formed by a bushing 68 surrounding the bolt 27. The bushing allows the bolt to tightly secure the base plate 26, riser 20 and seat pan 22 together while providing clearance between the shoulder 69 of the bushing and the head of bolt 27 for the latching lever 62 to rotate freely.

The latch mechanism 60 by having a latching lever 62 that rotates in a vertical plane, enables the latch mechanism to be packaged in a smaller space beneath the vehicle seat as compared to the latching lever of the referenced patent application that has a latching lever rotating in a horizontal plane about a vertical axis. In addition, the mounting of the latching lever is significantly simplified, enabling the existing mounting bolt 27 to be used to form the pivot 70.

In the event a seat occupant is properly restrained by a seat belt, during a front impact collision the panel 18 will still be deployed. Since the occupant will not move forward as would occur without the occupant being restrained, the panel will slap the occupant on the calves but will not cause any significant injury. The electronic latch release as described below can be used to prevent deployment when the occupant has fastened his or her seat belt.

Figure 3:
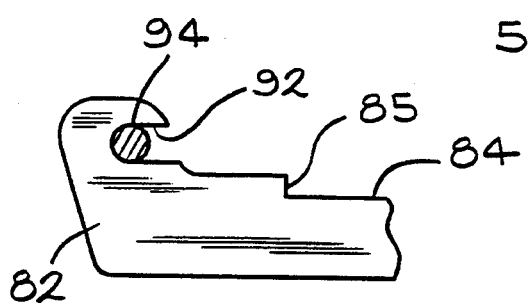
FIG. 3 is an elevational view of an alternative embodiment for mounting the panel.

With reference to FIG. 3, an alternative embodiment of the slide rail 34 is shown. Mounting boss portion 82 of the slide rail 84 includes a slot 92 for reception of the pivot pin 94 of the panel 18. The slot 92 extends forward from the rear edge of the mounting boss portion 82. The slot enables the panel 18 to be easily removed from the slide rail 84 after deployment during a vehicle collision. Removal of the panel 18 after a vehicle collision may assist in removing an injured passenger from the vehicle.

Figure 4:
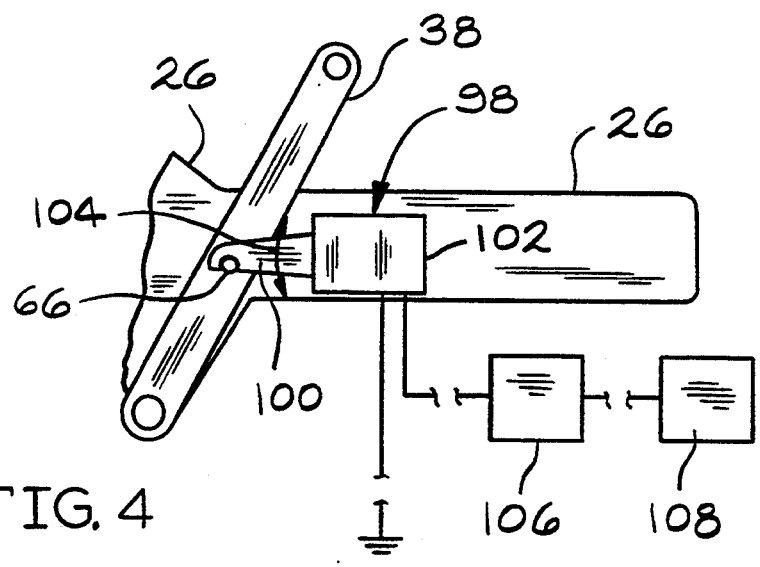
FIG. 4 is a schematic diagram showing the electronic release latch of the present invention for the panel.

With reference to FIG. 4, an alternative embodiment of the latch mechanism 62 is disclosed. The latching lever 62 has been replaced by a electronically activated latch mechanism 98 having a latching arm 100 having a hooked forward end for latching with the latch pin 66 on link 38. The latch mechanism 98 includes a solenoid 102 or other electronic actuator for moving the latch arm 100 as shown by the arrow 104 to unlatch the pin 66. The solenoid 102 is activated by an electronic signal produced by one or more accelerometers 106 that can be placed on the vehicle seat assembly or elsewhere on the motor vehicle. When the seat assembly is installed in a vehicle equipped with an air bag restraint system, the accelerometers used for triggering the air bag can be used to trigger the safety panel 18 such that both the air bag and the panel are triggered simultaneously. While a solenoid 102 is shown to actuate the release arm 100, other electromechanical devices can be used as well.

The safety panel 18 is intended to protect vehicle passengers who have not availed themselves of the belt restraint system provided either as a part of the seat assembly or provided on the vehicle structure. As a result, it is not necessary for the panel 18 to be deployed if the occupant has properly fastened his or her seat belt. To prevent deployment of the safety panel 18 when the vehicle occupant has fastened the seat belt, the electrical circuit for the solenoid 102 can include a seat belt switch 108 that will open when the seat belt is buckled, preventing deployment of the panel. Such seat belt switches are currently in use with warning system provided in vehicles to alert occupants to fasten their seat belts when the ignition is turned on if the seat belt has not been fastened.

The seat assembly of the present invention with an extendable front panel to protect vehicle occupants includes various improvements to the panel operating mechanism. The primary improvement pertains to an electronically activated release for the mechanism to simultaneously release the panel at the same time an air bag restraint system is activated. Without the electronic release, an inertia latch release mechanism is used that has been simplified to reduce the number of components involved in the latch mechanism.

It is to be understood that the invention is not limited to the exact construction illustrated and described above, but that various changes and modifications may be made without departing from the spirit and scope of the invention as defined in the following claims.

We claim:

1. A seat assembly for a vehicle comprising:
   a generally horizontal seat cushion having a frame and a front end; and
   support means mounted to said cushion for rotation from a stowed position to a generally horizontal support position extending forward from said front end of said cushion in response to a predetermined deceleration of said seat assembly for vertically supporting a seat occupant who has moved forward off said seat cushion in response to said deceleration;
   bias means acting on said support means to urge said support means to said support position;
   latch means for holding said support means in said stowed position in opposition to said bias means;
   electronically activated release means for releasing said latch means in response to an electrical signal; and
   sensing means for sensing deceleration of the vehicle and for producing said electrical signal in response to a deceleration above a predetermined value.

2. The seat assembly of claim 1 wherein said support means includes:
   a support panel having a generally upright stowed position at the front end of said cushion and having upper and lower ends in said stowed position;
   said seat cushion frame including a mounting boss for mounting said support panel to said frame; and
   means for pivotally mounting said support panel to said mounting boss of said frame adjacent the upper end of said panel for rotation about an axis extending transversely of said seat assembly whereby said panel lower end is rotatable upwardly and forwardly to place said panel in said generally horizontal support position.

3. The seat assembly of claim 2 wherein:
   said mounting means includes breakaway means for removing said support panel from said mount boss after rotation of said support panel to said support position.

4. The seat assembly of claim 3 wherein:
   said mounting means includes a pivot pin attached to said support panel and said mounting boss includes a slot for reception of said pivot pin, said slot being open at one end for removal of said pivot pin from said slot to allow removal of said support panel from said seat cushion.

5. The seat assembly of claim 2 further comprising a folding brace connected to said panel forward of said transversely extending axis and extending downwardly and rearwardly from said panel to said seat cushion frame to support said panel in said support position, said brace including first and second links pivotally attached to one another at one end of each link and with the opposite end of said first link being pivotally attached to the seat cushion frame and the opposite end of said second link being pivotally attached to the support panel; and
   a hand operated knob coupled to the opposite end of said first link for manually rotating said panel from said support position to said stowed position.

6. The seat assembly of claim 2 further comprising means for moving said mounting boss of said frame forward relative to the remainder of said frame upon rotation of said panel to said support position.

7. The seat assembly of claim 6 wherein:
said moving means includes at least one slide rail carried by said frame for fore and aft movement relative to said frame, said mounting boss forming a portion of said at least one slide rail, and further comprising stop means on said at least one slide rail to limit the travel of said at least one slide rail in both the forward and rearward directions.

8. The seat assembly of claim 7 further comprising coacting means on said at least one slide rail and said panel for preventing forward motion of said at least one slide rail in the absence of rotation of said panel to said support position.

9. The seat assembly of claim 8 wherein said coacting means includes a front edge of said at least one slide rail being parallel to and closely spaced from said panel.

10. A vehicle seat assembly for installation in a vehicle including a belt restraint system for an occupant of said seat assembly comprising:
 a generally horizontal lower seat cushion having front and rear ends and a seat cushion frame;
 a panel member mounted to the front end of said seat cushion for rotation about a horizontal axis transverse to said seat assembly, said panel member having a generally upright stowed position in which said panel member extends downwardly from said transverse axis forming a front surface of said seat cushion, said panel member being rotatable about said axis to a support position extending forwardly from the front end of said seat cushion;
 bias means acting on said panel to urge said panel to said support position;
 latch means for holding said panel in said stowed position in opposition to said bias means;
 electronically activated release means for releasing said latch means in response to an electrical signal; and
 first sensing means for sensing deceleration of the vehicle and for producing said electrical signal in response to a deceleration above a predetermined value.

11. The seat assembly of claim 10 further comprising:
 second sensing means for sensing when a seat assembly occupant has fastened said belt restraint system and for producing an output in response thereto; and
 means for disabling said release means in response to said output to prevent release of said latch means when the seat assembly occupant has fastened said belt restraint system.

12. The seat assembly of claim 10 wherein said release means includes a solenoid connected to said latch means for releasing said latch means whereby said bias means operates to rotate said panel to said support position.

13. The seat assembly of claim 10 wherein said latch means includes a fore and aft extending latch lever pivotally mounted to said seat cushion frame for rotation in a generally vertical plane.

14. A vehicle seat assembly comprising:
 a generally horizontal lower seat cushion having front and rear ends;
 a seat frame including left and right laterally spaced risers extending fore and aft along the sides of said seat assembly;
 a seat pan disposed between said risers and attached to said risers by a plurality of attaching members;
 left and right base plates attached to said left and right risers respectively and extending forwardly from said risers, said base plates each being attached to one of said risers by at least one of said attaching members used to attach said seat pan to said risers;
 a panel member having a generally upright stowed position at the front end of said seat cushion and being movable to a support position extending generally horizontally forward from the front end of said seat cushion;
 means for mounting said panel member to said base plates for rotation from said stowed position to said support position;
 a pair of braces for supporting said panel member in said support position, said braces being connected at one end to said base plates and at the other end to said panel member;
 bias means for moving said panel member from said stowed position to said support position;
 a latch lever pivotally mounted to one of said base plates for rotation in a generally vertical plane, said latch lever having a forwardly extending latch leg with a hooked end portion;
 a pin extending from said brace for reception in said hooked end portion to hold said panel member in said stowed position; and
 release means for automatically rotating said latch lever in response to a predetermined deceleration acting upon said seat assembly to release said latch lever from said pin whereby said bias means is free to rotate said panel member to said support position.

15. The seat assembly of claim 14 wherein said release means includes a release leg coupled to said latch lever and extending downwardly from the pivotal mount of said latch lever and weight means at the lower end of said release leg whereby when said seat assembly experiences a deceleration above said predetermined deceleration, the inertia of said release leg causes said release leg to pivot forward, rotating said latch leg to release said pin and allow said panel member to rotate to said support position.

16. The seat assembly of claim 14 when installed in a vehicle having a belt restraint system for an occupant of said seat assembly further comprising:
 means for sensing when a seat assembly occupant has fastened said belt restraint system and for producing an output in response thereto; and
 means for disabling said release means in response to said output to prevent release of said latch lever when the seat assembly occupant has fastened said belt restraint system.

17. The seat assembly of claim 14 wherein said release means includes:
 electronically activated means for releasing said latch lever in response to an electrical signal; and
 sensing means for sensing deceleration of the vehicle and for producing said electrical signal in response to a deceleration above a predetermined value.

18. The seat assembly of claim 17 when installed in a vehicle having a belt restraint system for an occupant of said seat assembly further comprising:
 means for sensing when a seat assembly occupant has fastened said belt restraint system and for producing an output in response thereto; and
 means for disabling said release means in response to said output to prevent release of said latch lever when the seat assembly occupant has fastened said belt restraint system.

19. The seat assembly of claim 14 further comprising left and right slide rails carried by said left and right base plates respectively for fore and aft sliding movement, said slide rails each including a mounting boss and said panel member including pivot pins extending through said slide rail mounting bosses for rotatably mounting said panel member to said seat frame.

* * * * *